United States Patent [19]

Sakarya et al.

[11] 4,264,896
[45] Apr. 28, 1981

[54] REGULATOR ARRANGEMENT USEFUL IN AN INFRARED REMOTE CONTROL TRANSMITTER

[76] Inventors: Dursun Sakarya, 5330 E. 21st St., #3, Indianapolis, Ind. 46218; John B. George, 2309 Lema Cir., Indianapolis, Ind. 46229

[21] Appl. No.: 59,470

[22] Filed: Jul. 20, 1979

[51] Int. Cl.³ .................. H04Q 9/14; H03K 5/04; G05F 1/44
[52] U.S. Cl. ................. 340/167 R; 323/299; 307/265; 307/360; 340/168 B
[58] Field of Search ........... 340/167 R, 167 P, 171 R, 340/168 R; 323/20; 307/297, 265, 360

[56] References Cited

U.S. PATENT DOCUMENTS

| | | | |
|---|---|---|---|
| 3,967,159 | 6/1976 | Dendy et al. | 323/20 |
| 4,045,777 | 8/1977 | Mierzwinski et al. | 340/168 B |
| 4,072,889 | 2/1978 | Witmer et al. | 323/20 |
| 4,099,163 | 7/1978 | Worley et al. | 340/168 B |

*Primary Examiner*—Donald J. Yusko

[57] ABSTRACT

In an infrared (IR) remote control transmitter, a main amplitude regulator is provided to regulate the amplitude of pulses applied to the transmitter's driver so as to maintain infrared radiation at a level consistent with proper operation but well below a safe limit for IR radiation under normal operating conditions. An auxiliary amplitude regulator is also provided to regulate the amplitude of pulses applied to the driver so as to maintain infrared radiation below the safe limit if the amplitude exceeds a predetermined threshold level due to a component failure of the main amplitude regulator. An average detector is also coupled to the auxiliary amplitude regulator so that the amplitude of the pulses applied to the driver is reduced should their width exceed beyond a desired value due to a component failure or misoperation of the transmitter.

8 Claims, 1 Drawing Figure

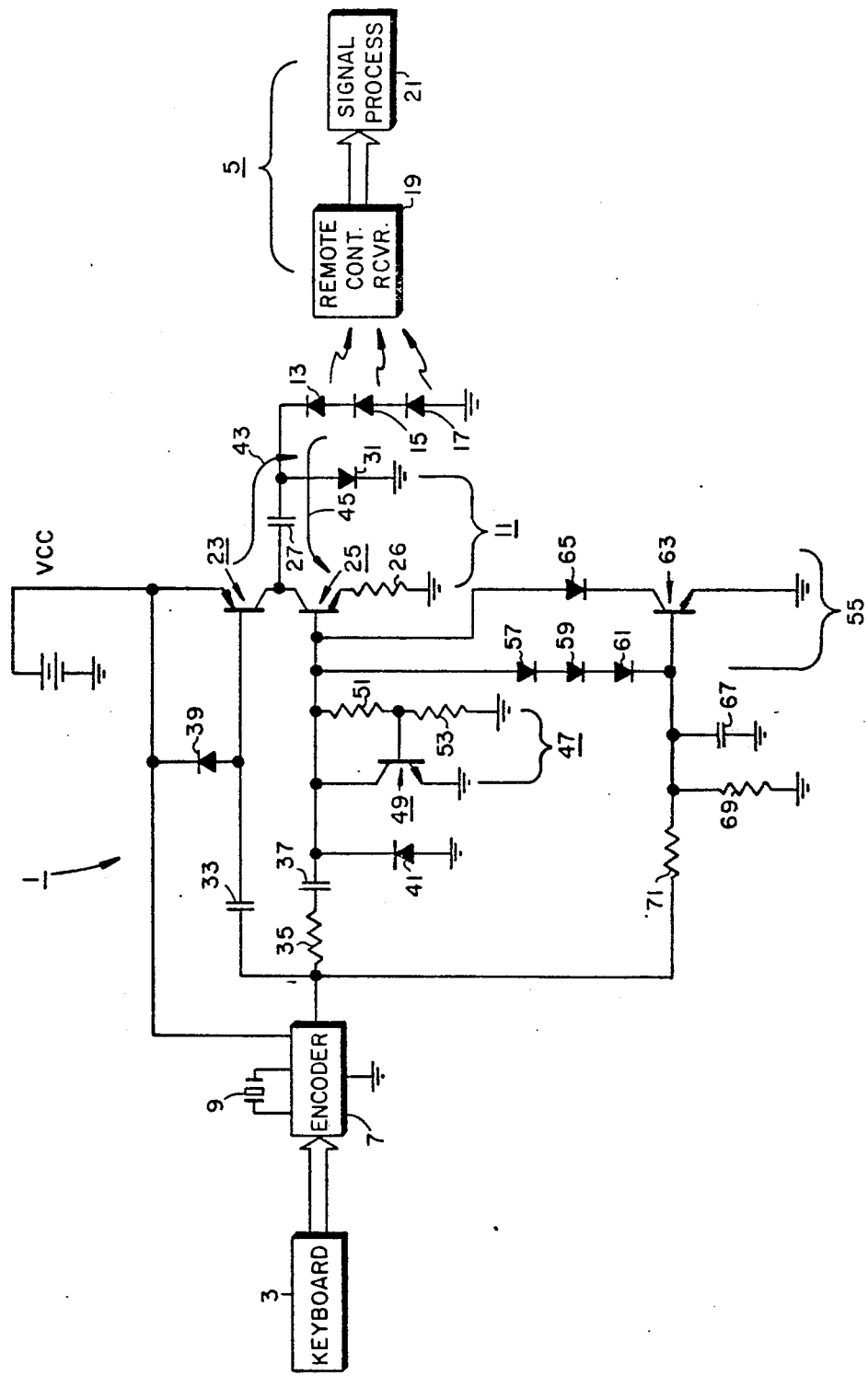

REGULATOR ARRANGEMENT USEFUL IN AN INFRARED REMOTE CONTROL TRANSMITTER

BACKGROUND OF THE PRESENT INVENTION

The present invention relates to the field of infrared remote control transmitters.

Infrared remote control systems for television receivers and the like are more desirable than more conventional ultrasonic remote control systems since they are significantly less susceptible to interference signals such as those stemming from multipath signal reflections. Unfortunately, the human eye may be harmed under conditions of prolonged, continuous and direct exposure to infrared (IR) radiation.

To reduce the possibility of harm to the eyes of users, special pulse codes are utilized in IR remote control systems to limit the duty cycle of IR radiation during the transmission of remote control messages. In addition, amplitude regulator circuits may be employed in remote control transmitters to maintain the power level of IR radiation during transmission under normal operating conditions. However, these precautions do not contemplate many component failure conditions which may cause excessive IR radiation.

In copending U.S. Pat. application Ser. No. 025,165 filed in the name of Dursun Sakarya on Mar. 29, 1979, a drive circuit for IR light-emitting diodes of a remote control transmitter is described which is arranged to be "fail-safe" in the sense that failures of components within the drive circuit result in the reduction of the amplitude of the drive signal and thereby the level of IR radiation during transmission.

SUMMARY OF THE PRESENT INVENTION

The present invention includes a regulator arrangement embodied in an IR remote control transmitter coupled between a source of input pulses and a drive circuit for maintaining the level of IR radiation at a level below, and desirably well below, the safe level but consistent with proper operation during normal operating conditions and for maintaining the IR radiation at a safe level should either the amplitude or duty cycle of the input pulses exceed values corresponding to undesired levels of IR radiation during abnormal operating conditions. A preferred embodiment of the regulator arrangement includes a main amplitude regulator for regulating the amplitude of the input pulses during normal operating conditions, an auxiliary amplitude regulator for regulating the amplitude of the input pulses should the amplitude of the input pulses exceed a first predetermined level due to a component failure within the main amplitude regulator, and an average detector for causing the auxiliary amplitude regulator to reduce the amplitude of the input pulses should the average level of the input signal exceed a second predetermined level due to a component failure or misoperation of an input pulse encoder.

BRIEF DESCRIPTION OF THE DRAWING

The drawing includes a single FIGURE which shows partially in block diagram form and partially in schematic diagram form an IR remote control system including a transmitter constructed in accordance with the present invention.

DETAILED DESCRIPTION OF THE DRAWING

In the sole FIGURE, a remote control transmitter 1 includes a keyboard 3 including a number of keys (not shown) corresponding to various functions of a remotely located system 5. By way of example, if system 5 is a television receiver, keyboard 3 may include five keys: namely, one for turning the receiver on and off, a pair for increasing and decreasing the channel number of the channel to which the receiver is tuned, and a pair for increasing and decreasing the volume. When a key of keyboard 3 is operated, an input encoder 7 generates an electrical carrier signal having a frequency of approximately 40 KHz determined by an externally connected crystal 9. The carrier signal is amplitude modulated by an envelope signal including a series of pulses encoded to produce a functional response of system 5 corresponding to the operated key. The amplitude modulated carrier is applied to a drive 11 which in response generates a drive signal for IR diodes 13, 15 and 17. In response to the drive signal, diodes 13, 15 and 17 emit bursts of light in the IR frequency range corresponding to the pulses of the envelope signal.

The bursts of light are received by a remote control receiver 19 of system 5 and converted into electrical control signals representing the function to be controlled. For this purpose, remote control receiver 19 includes a diode (not shown) responsive to light in the IR frequency range for converting the bursts of light into corresponding electrical pulse signals and a decoder (not shown) for decoding the electrical pulse signals to generate the control signals. The control signals are coupled to a respective portion of a signal processing unit 21 of system 5 for controlling the selected function.

IR remote control systems and their various components are well known and therefore need not be described in detail here. E.g., encoder 7 and the decoder of remote control receiver 19 may comprise S2600 and S2601 integrated circuits commercially available from American Microsystems, Inc. of Santa Clara, Calif.

The envelope of the amplitude modulated carrier signal generated by encoder 7 may have a variety of well-known code formats. For example, the envelope signal may include a series of positive-going pulses each of which has either a relatively long or short duration corresponding to a binary "1" or a binary "0", respectively. The sequential arrangement of "1's" and "0's" determines the selected function. While the exact nature of the code format is not directly germane to the present invention, it is desirable that the code format be arranged so that the duration of IR radiation during a transmission is relatively low for reasons of safety as discussed above. This may be accomplished by causing the envelope signal to have a relatively low, e.g., less than 20 percent, duty cycle.

Driver 11 comprises a push-pull amplifier arrangement of the type disclosed in the aforementioned copending application, hereby incorporated by reference. The push-pull amplifier arrangement includes a PNP transistor 23 and an NPN transistor 25 having their collector-to-emitter junctions connected in series with a resistor 26 between a positive supply voltage VCC provided by a battery and signal ground. The output of the push-pull arrangement at the junction of the collectors of transistors 23 and 25 is connected through a capacitor 27 to the cathode of IR diode 13. IR diodes 13, 15 and 17 are in series between capacitor 27 and signal ground and all are poled so as to be rendered conductive in response to the development of negative voltages at the cathode of IR diode 13. A diode 31 shunts the series connection of IR diodes 13, 15 and 17. The amplitude modulated carrier generated by encoder 7 is applied to one input of the push-pull arrangement at the base of transistor 23 through a capacitor 33 and is applied to another input of the push-pull arrangement at the base of transistor 25 through the series path comprising a resistor 35 and capacitor 37. A diode 39 shunts the base-emitter junction of transistor 23 and a diode 41 shunts the series connected combination of base-emitter junction of transistor 25 and resistor 26.

In operation, transistor 25 is rendered conductive and transistor 23 is rendered nonconductive in response to the leading edges of the positive-going pulses generated by encoder 7. Transistor 25 is rendered nonconductive and transistor 23 is rendered conductive in response to the trailing edges of the positive-going pulses. Diodes 39 and 41 serve as discharging paths for capacitors 33 and 37 during the intervals when transistors 23 and 25, respectively, are nonconductive. Diodes 39 and 41 also protect the base-to-emitter junction of transistors 23 and 25 from reverse breakdown failure voltages.

When transistor 23 is conductive and transistor 25 is nonconductive, capacitor 27 is charged in the direction of arrow 43 from positive supply voltage VCC through the emitter-to-collector path of transistor 23 and forward biased diode 31. When transistor 25 is conductive and transistor 23 is nonconductive, capacitor 27 is discharged in the direction of arrow 45 to signal ground through the collector-to-emitter path at transistor 25, resistor 26 and forward biased IR diodes 13, 15 and 17.

As capacitor 27 is charged and discharged, positive and negative voltages, respectively, are developed at the cathode of IR diode 13. However, IR diodes 13, 15 and 17 are rendered conductive only when the voltage developed at the cathode of IR diode 13 is negative. Thus, IR radiation is only emitted when the voltage developed at the cathode of diode 13 has the polarity opposite to the polarity of the supply voltage VCC. This is most desirable since it makes the driver arrangement essentially "fail-safe" to component failures within the driver itself. As is discussed in greater detail in the aforementioned copending application, when a component failure occurs in driver 11, the level of IR radiation is at least reduced.

It will be appreciated that while three IR diodes are employed in the present arrangement, a single IR diode may be employed. Any number more than one IR diode is desirable since they may have lower power ratings than a single IR diode providing the same amount of IR radiation. Three IR diodes are employed in transmitter 1 as a compromise between power and cost considerations. In addition, IR diodes 13, 15 and 17 are desirably physically separated to avoid the concentration of IR radiation on one point in a user's eye if transmitter 1 is improperly directed.

While transistors 23 and 25 serve as the switching elements of the arrangement shown in the sole FIGURE, it will be appreciated that other switching elements may replace them. E.g., Darlington transistor or other current amplifying configurations may replace transistors 23 and 25 when higher charging and discharging currents than may be obtained in the present arrangement are desired.

A shunt voltage regulator 47 is connected between the base of transistor 25 and signal ground to maintain the magnitude of the voltage at the base of transistor 25 and thereby the magnitude of the IR drive current (indicated by arrow 45) at levels corresponding to a safe level of IR radiation. Without regulator 47, the magnitude of the IR drive current would vary with the battery voltage VCC. In this situation, if battery voltage VCC were selected to have an initially high value to account for later degradation, the magnitude of drive current could be initially higher than desired with respect to the level of IR radiation. With regulator 47, however, even if battery voltage VCC is selected to have an initially high value to account for later degradation, the level of drive current is maintained at a predetermined level which is desirably well below the safety limit of IR radiation.

Regulator 47 includes an NPN transistor 49 having its collector-to-emitter junction connected between the base of transistor 25 and signal ground. The junction of resistors 51 and 53, which are connected in series between the base of transistor 25 and signal ground, is connected to the base of transistor 49. The arrangement of regulator 47 establishes a voltage, e.g., 2.1 to 2.2 vdc, at the base of transistor 25 which is, in effect, a product of the substantially constant voltage at the base of transistor 49 and the ratio of the sum of the values of resistors 51 and 53 to the value of resistor 53.

Regulator 47 is similar in function to a Zener diode connected between the base of transistor 25 and signal ground. However, regulator 47 has significantly better regulation characteristics (i.e., it is faster and has a sharper break point) than a Zener diode at the operative frequency and voltage conditions.

The voltage difference between the output of encoder 7 and the voltage at the base of transistor 25 is developed across resistor 35. The substantially constant forward bias base-to-emitter voltage drop of transistor 25 in combination with the substantially constant peak voltage at the base of transistor 25 establish a regulated peak pulse voltage across resistor 26. The regulated peak pulse voltage across resistor 26 and the value of resistor 26 determine the magnitude of the drive current. The magnitude of the drive current is desirably selected to have a level required for the emission of IR radiation by IR diodes 13, 15 and 17 but well below the safe IR radiation level.

An auxiliary voltage regulator 55 is also connected between the base of transistor 25 and signal ground to regulate the voltage at the base of transistor 25 should a component failure in main regulator 47 cause the voltage at the base of transistor 25 to exceed a predetermined threshold voltage. Auxiliary regulator 55 includes diodes 57, 59 and 61 connected in series between the base of transistor 25 and an NPN transistor 63. A diode 65 and the collector-to-emitter junction of transistor 63 are connected in series between the base of transistor 25 and signal ground. Should the voltage developed across capacitor 67 exceed the predetermined threshold voltage, i.e., the sum of the forward voltages developed across the junction of diodes 57, 59 and 61 and the base-to-emitter junction of transistor 63, transistor 63 is rendered conductive. As a result, base current is diverted away from the base of transistor 25 through diode 65 and the collector-to-emitter path of transistor 63. After the thresold voltage is reached, the amount of base current diverted from the base of transistor 25 is directly related to the magnitude of voltage developed at the base of transistor 63. As a result of this relationship, after the predetermined threshold voltage, e.g., approximately 2.2 vdc, is attained, the voltage at the base of transistor 25 is maintained at a peak voltage, e.g., approximately 2.8 vdc. Both the predetermined threshold voltage and the voltage maintained by auxiliary voltage regulator 55 are selected to ensure that the IR radiation is well below the safe IR radiation limit.

Increases of the average level of the output signal due to corresponding increases in the duty cycle of the output signal of encoder 7 may also cause the level of the IR radiation to increase beyond a desired limit. Increases of the average level of the output signal may occur, e.g., due to a component failure within keyboard 3 or encoder 7 or when two or more keys of keyboard 3 are operated simultaneously. To inhibit increases in the magnitude of the drive current for IR diodes 13, 15 and 17 in response to such increases of the average level of the output signal of encoder 7, a capacitor 67 is advantageously coupled to auxiliary regulator 55 in an average detector configuration for reducing the magnitude of the drive current should the average level of the output signal of encoder 7 exceed a predetermined level. Along with capacitor 67, the average detector includes resistors 69 and 71 connected in series between the output of encoder 7 and signal ground. The junction of resistors 69 and 71 is connected to capacitor 67. When the average level of the output signal of encoder 7, developed across capacitor 67, increases beyond the predetermined threshold level, e.g., 1.8 vdc, determined by the selection of the values of resistors 69 and 71, transistor 63 is rendered conductive. Thereafter, transistor 63 functions in the aforementioned manner to regulate the drive current for IR diodes 13, 15 and 17 by regulating the base current of transistor 25.

What is claimed is:

1. In a remote control transmitter for controlling at least one function of a remotely located system, apparatus comprising:
   transducer means for emitting infrared radiation in response to a drive signal;
   input means for generating an input signal including a series of pulses having a time-related characteristic controlled to represent said function;
   driver means for generating said drive signal in response to said input signal; and
   regulator means responsive to the amplitude and width of said pulses for maintaining the magnitude of said drive signal below a magnitude corresponding to a safe level in infrared radiation.

2. The apparatus recited in claim 1 wherein:
   said regulator means includes first amplitude regulation means for normally regulating the amplitude of said pulses; and second amplitude regulation means for regulating the amplitude of said pulses when the amplitude of said pulses exceeds a predetermined threshold level.

3. The apparatus recited in claim 2 wherein:
   said regulator means includes average detector means for detecting the average value of said input signal coupled to said second amplitude regulation means for causing said second amplitude regulation means to reduce the amplitude of said pulses when the average value of said input signal exceeds a predetermined threshold level.

4. The apparatus recited in claim 3 wherein:
   said driver means includes first and second switching means having conduction paths connected in series between a source of operating voltage of a predetermined polarity and a point of reference potential and having control inputs for receiving said input signal; and capacitor means connected in series between the junction between the conduction paths of said first and second switching means and said transducer;
   said transducer means includes at least one infrared diode connected between said capacitor means and said point of reference potential and poled with respect to said point of reference potential so as to be nonconductive when voltages having the same polarity as said operating voltage are developed at a first point between said capacitor means and said infrared diode and conductive when said voltage developed at said first point has the polarity opposite to said predetermined polarity;
   one of said first and second switching means being rendered conductive in response to said pulses and the other one of said switching means being rendered nonconductive in response to said pulse; and
   said first and second amplitude regulation means being connected to a second point between said input means and the one of said first and second switching means which when conductive causes voltages having the polarity opposite to said predetermined polarity to be developed at said first point.

5. The apparatus recited in claim 4 wherein:
   said first amplitude regulation means includes a first bipolar transistor having its collector-to-emitter path connected between said second point and said point of reference potential and having its base connected to the junction of a first and a second resistor connected in series between said second point and said point of reference potential.

6. The apparatus recited in claim 5 wherein:
   said second regulator means includes a second bipolar transistor havings its collector-to-emitter path connected between said second point and said point of reference potential and havings its base connected to said second point.

7. The apparatus recited in claim 6 wherein:
   said average detector means includes a second capacitor connected between the base of said second transistor and said point of reference potential and a third resistor connected between said input means and the base of said second transistor.

8. In a remote control transmitter for controlling at least one function of a remotely located system, apparatus comprising:
   transducer means for emitting infrared radiation in response to a drive signal;
   input means for generating an input signal including a series of pulses having a time-related characteristic controlled to represent said function;
   driver means for generating said drive signal in response to said input signal;
   main amplitude regulator means for normally regulating the amplitude of said pulses applied to said driver means to maintain the infrared radiation below a safe limit;
   auxiliary amplitude regulator means for regulating the amplitude of said pulses applied to said driver means when the amplitude of said pulses exceeds a first predetermined threshold level; and
   average detector means coupled to said auxiliary amplitude regulator for causing said auxiliary amplitude regulator to reduce the amplitude of said pulse applied to said driver means when the average value of said input signal exceeds a second predetermined level.

* * * * *

UNITED STATES PATENT AND TRADEMARK OFFICE
CERTIFICATE OF CORRECTION

PATENT NO. : 4,264,896

DATED : 4-28-81

INVENTOR(S) : Dursun Sakarya et al.

It is certified that error appears in the above—identified patent and that said Letters Patent is hereby corrected as shown below:

Column 5, line 47, "in" should be --of--.

Column 6, line 17, "pulse" should be --pulses--.

Signed and Sealed this

Fifteenth Day of December 1981

[SEAL]

Attest:

Attesting Officer

GERALD J. MOSSINGHOFF

Commissioner of Patents and Trademarks